June 4, 1963  A. ALVAREZ-CALDERÓN  3,092,354
AERODYNAMIC SYSTEM AND APPARATUS
Filed Aug. 8, 1960  3 Sheets-Sheet 1
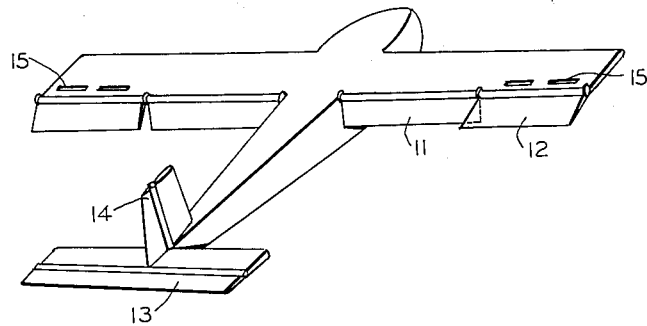
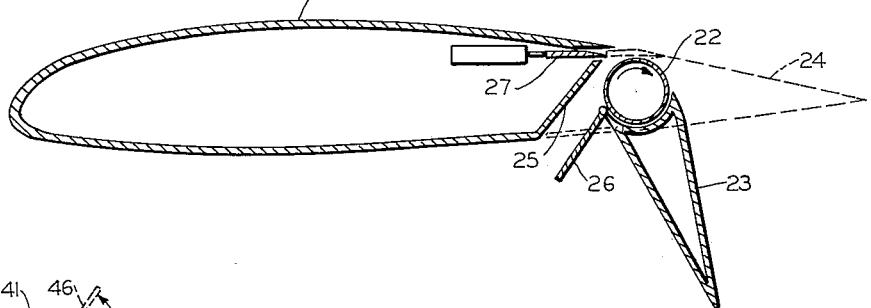
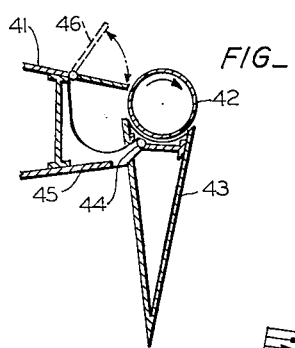
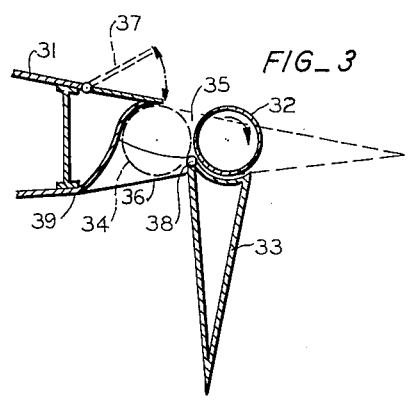
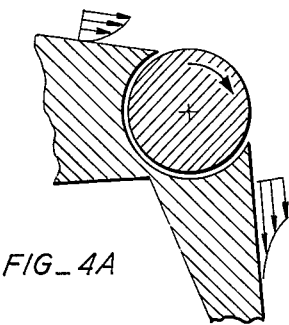
INVENTOR.
ALBERTO ALVAREZ-CALDERÓN
BY Naylor & Neal June 4, 1963  A. ALVAREZ-CALDERÓN  3,092,354
AERODYNAMIC SYSTEM AND APPARATUS
Filed Aug. 8, 1960  3 Sheets-Sheet 2
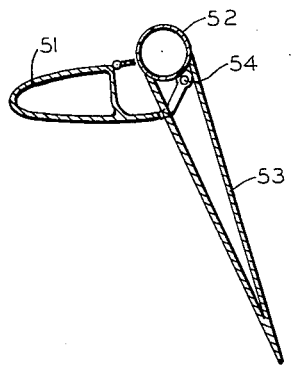
FIG_5
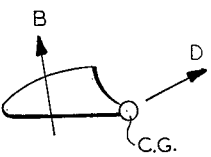
FIG_5A
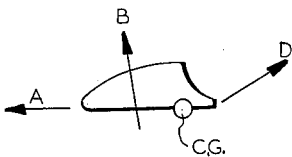
FIG_5B
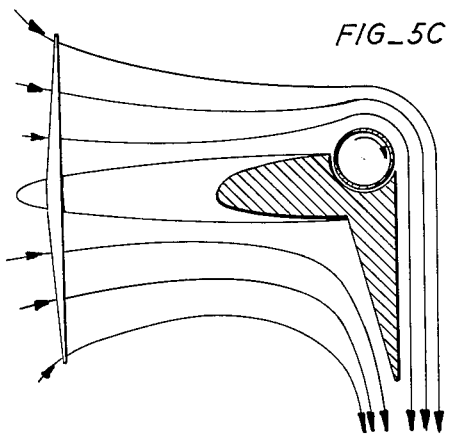
FIG_5C
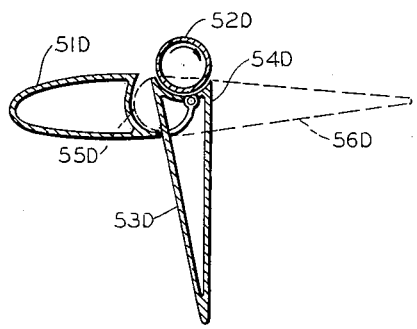
FIG_5D
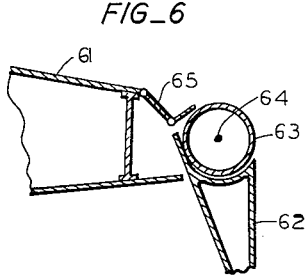
FIG_6
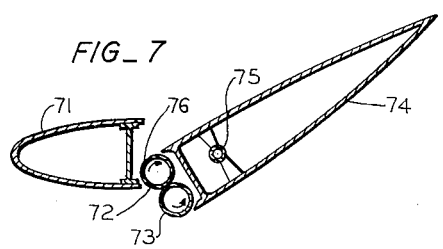
FIG_7
INVENTOR.
ALBERTO ALVAREZ-CALDERÓN
BY Naylor & Neal June 4, 1963 A. ALVAREZ-CALDERÓN 3,092,354
AERODYNAMIC SYSTEM AND APPARATUS
Filed Aug. 8, 1960 3 Sheets-Sheet 3
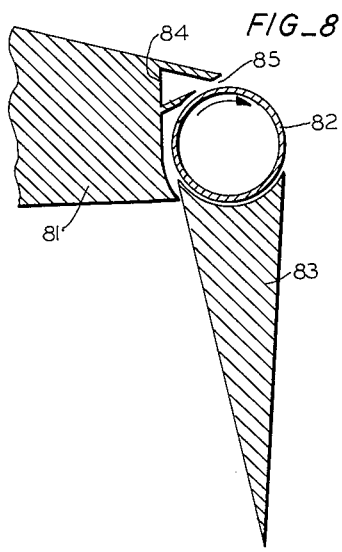
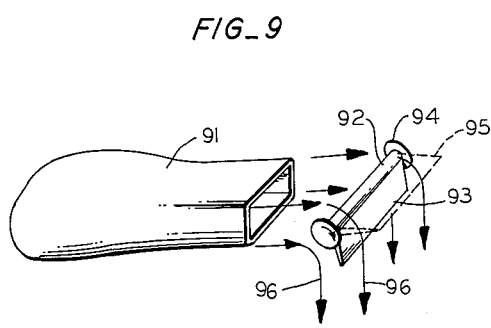
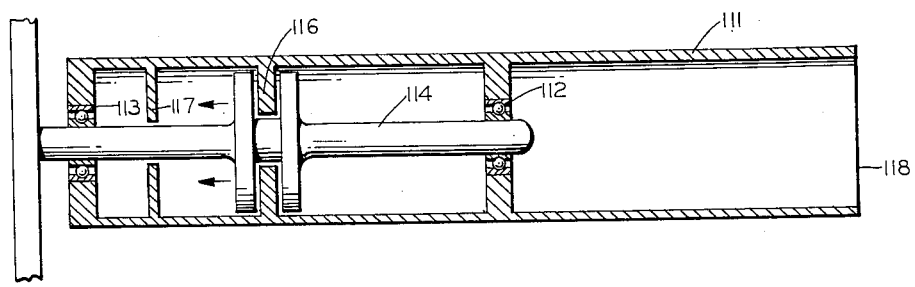
INVENTOR.
ALBERTO ALVAREZ-CALDERÓN
BY Naylor & Neal

United States Patent Office 3,092,354
Patented June 4, 1963

3,092,354
AERODYNAMIC SYSTEM AND APPARATUS
Alberto Alvarez-Calderón, 3449 Rambow,
Palo Alto, Calif.
Filed Aug. 8, 1960, Ser. No. 48,038
27 Claims. (Cl. 244—10)

The present invention relates generally to aerodynamics systems and apparatus for the production of lift or control forces for aircraft or missiles, and more particularly, to cylindrical structures for such utilization. It relates to improvements in the structures for such utilization. It relates to improvements in the structures described and claimed in my previous U.S. patent application, Ser. No. 29,656 of May 16, 1961, of which the present application is a continuation in part.

In recent years, numerous novel principles and approaches have been proposed to advance flight technology and the utility of aircraft and/or missiles, some of the concepts representing extremely radical departures from conventional aerodynamic practice. Concomitant with such advances, new and difficult problems have been presented to the aerodynamicist. As one relatively simple and obvious example, the flight of aircraft at supersonic speeds has entailed a compromise in the aerodynamic design; a compromise between the relatively small, thin and special shape wing required for effective operation at supersonic speeds and the generally larger wing area with shapes to provide good lift chcaracteristics enabling landing and take-off at relatively slow speeds.

Recent developments and importance of the STOL and VTOL aircraft, as well as the general trend toward higher wing ladings and landing speeds, point to the necessity of high-lift devices and roll control systems which have better aerodynamic characteristics than those provided by geometric modifications of the wings, such as slats, flaps, and interceptor ailerons.

Yet more complex problems are presented in the provision of an effective design for a vertical take-off and landing aircraft (VTOL) or the closely allied short take-off and landing aircraft (STOL) including such radical designs as the ducted fan aircraft. The problems referred to not only concern the lift characteristic of these novel aircraft and/or missiles but also the control of such aircraft so as to maintain good characteristics of pitch, roll and yaw. For example, the problems of roll control in STOL aircraft and in jet aircraft are well known to many pilots.

Aerodynamicists have in general investigated the aerodynamic characteristics of bodies of various shapes in attempts to achieve optimum lift, or control forces. Among the configurations investigated is the cylinder whose theoretical maximum lift coefficient, a dimensionless quantity indicative of the aerodynamic force-producing capability of the structure is 4. Experimental investigation has shown that the lift coefficient practically obtainable with a rotating cylinder is approximately 9.5 (Ref.: NACA TN 209), while the lift coefficient obtainable with a hollow porous cylinder with a vane and with suction applied to its interior is in the neighborhood of 9. The significance of these figures becomes more apparent when it is realized that the lift coefficient of a well-designed wing is in the neighborhood of 2.4 for subsonic airplanes and less than 1 for some supersonic aircraft.

The use of rotating cylinders to obtain certain desirable aerodynamic effects has been suggested before. As early as 1924 in NACA Technical Note, No. 209, there was reported "Tests of Rotating Cylinders" in which it was demonstrated experimentally in the United States that the combination of translation and circulatory flows resulted in a lift which increased with increase in circulation.

Later, in 1926 in NACA Technical Memorandum No. 354 there appeared "Tests for Determining the Effect of a Rotating Cylinder Fitted into the Leading Edge of an Airplane Wing." It was concluded therein that its effect on lift was practically the same as making a slot in the wing, and that the phenomenon was due to the effect of the cylinder on the velocity of air in the boundary layer on the top of the wing behind the cylinder. Some of the more specific findings are given briefly below.

Measurements of the forces developed by rotating cylinders in the presence of cross flows were made by Pradtl at Goettingen, by the NACA and by others. Values of lift coefficient of 9.5 based on projected cylinder area have been measured. Lift-drag ratios of the order of 7.8 have been obtained (Ref. NACA TN 209).

The use of a rotating cylinder as a leading edge high-lift device was investigated by E. B. Wolff and C. Koning. From a comparison of this device with the Handley-Page slot it can be observed that both systems produce about the same value of $C_{L_{max}}$ of 2.2 at vastly different angles of attack (Rev. NACA TM 354 and NACA WR L 263).

While rotating cylinders have been considered for some aerodynamic applications in the past, their benefits did not compensate for the complications introduced by the rotating cylinder. The full advantages obtainable from the rotating cylinder were not realized until some new arrangements and effects which I shall demonstrate hereafter.

The fact that a suction porous cylinder can provide very large lift has been shown theoretically and experimentally in British R & M 2787 by Thwaites.

Briefly, suction eliminates low energy of boundary layer and therefore the flow can negotiate curvatures and pressures of cylinder to meet the stagnation points required by the geometry of the body.

While significant advances have been made in boundary layer control systems based on suction or blowing, no STOL or VTOL production aircraft exist today depending on these methods for their operation. This indicates that in the practical operation of these systems, the complications still outweigh the merits.

It is the general object of the present invention to provide aerodynamic apparatus for aircraft or missiles whose design incorporates a force producing cylinder or cylinders in a manner to take advantage of their desirable aerodynamic characteristics.

The term "force-producing cylinder" denotes the structures on the leading edge of the flap which have a convex, generally cylindrical surface thereof for effecting control of boundary layer flow over the flap. Specific examples of such "force-producing cylinders" for instance are: (a) Circular cylinders mounted on the leading edge of the flap and rotated about their long dimensions; (b) fixed hollow structures forming the leading edge of the flap and which have porous surface portions with the general shape of a portion of a cylinder with suction means for drawing air in through the porous portions, and (c) hollow and porous circular cylinders having internal suction and mounted on the leading edge of the flap for rotating about the cylinder's long dimensions. Additionally, the use of boundary layer control by combined blowing and rotation and blowing alone is contemplated as an alternative means for force-producing cylinders. The term "force producing cylinder" as used hereinafter and particularly in the claims includes the mentioned rotating cylinder, suction cylinder or any other structure, cylindrical or not, which is aerodynamically equivalent in its function or characteristics.

More particularly, it is a feature of the invention to provide an aerodynamic apparatus incorporating a force-producing cylinder which entirely provides lift and/or control forces, or alternatively, augments the existing lift forces of an aircraft or missile.

Additionally, it is a feature to provide an aerodynamic apparatus incorporating force producing cylinders in a fashion to facilitate control of pitch, roll and/or yaw of an aircraft.

It is a further feature of the invention to provide an aerodynamic apparatus incorporating a force producing cylinder in combination with a flap, aileron, elevator or other control structure to enhance its effect.

Yet another feature of the invention is to provide an aerodynamic apparatus incorporating a force-producing cylinder in a manner such that the effects of such cylinder can be rendered operable or inoperable in accordance with the desired flight characteristics of the aircraft.

It is another feature of the invention to provide aerodynamic apparatus wherein a force-producing cylinder is incorporated in a manner to divert the propeller slipstream, or jet thrust, of an aircraft through an angle of approximately 90° to provide a VTOL device, together with means for rendering the pitching moment of the structure at zero or negligible value.

Yet another object of my invention is to provide improved lift and control of aircraft by the application of rotating cylinders in the air flows around said airplanes.

It is another object of my invention to obtain superior roll control of an airplane by the use of rotating cylinders in combination with conventional wings to better perform the functions of the usual ailerons, especially at slower aircraft air speeds.

It is still another object of my invention to provide a high-lift device to improve lift characteristics of airplanes which have high speeds in normal flight.

Another object of my invention is to provide a high-lift system suitable for airplanes capable of STOL, and vertical take-off and landing by the deflected slipstream method.

It is a more specific object of my invention to provide some of the superior flying characteristics enumerated herein by placing a rotating cylinder near the flaps on the wings of an airplane.

I have discovered further that when positioned near the trailing edge flap of a conventional wing, such rotating cylinders will produce substantially greater lift on the wing. When used in proper combination with trailing edge wing flaps I am able to achieve short take-off and landing. By an unusual combination of rotating cylinders and flaps I am able to efficiently turn a jet of air around 90° and thus achieve vertical take-off and landing as I will more fully describe herein below.

These as well as other objects and features of the invention will become more apparent from a perusal of the following description of the various embodiments illustrated in the accompanying drawings wherein:

FIG. 1 is a perspective view, somewhat diagrammatic in nature, of a winged aircraft embodying a force-producing cylinder of the aircraft.

FIG. 2 is a diagrammatic sectional view through a wing and the associated aerodynamic lift and control apparatus for the aircraft illustrated in FIG. 1.

FIG. 3 is a fragmentary transverse diagrammatic sectional view generally similar to FIG. 2 showing a slightly modified arrangement.

FIG. 4 is yet another view similar to FIGS. 2 and 3 showing a further modification.

FIG. 4A is an auxiliary figure showing a flow condition of FIG. 4.

FIG. 5 is another modified arrangement generally similar to FIGS. 2, 3 and 4, but arranged generally to permit vertical take-off and landing operation, or very large control forces.

FIGS. 5A and 5B are force-diagrams illustrating the aerodynamic force vectors associated with the structure of FIG. 5.

FIG. 5C is a sketch showing an idealized 90° slipstream rotation by means of a rotating cylinder flap.

FIG. 5D is a diagram of a wing with flap and rotating cylinder near its trailing edge which shows a system of obtaining high-lift in an airplane or short or vertical take-off, and landing.

FIG. 6 is a view generally similar to FIGS. 2 through 8, inclusive, illustrating yet a further modified arrangement applicable for use in the aerodynamic control or lift of the aircraft of FIG. 1.

FIG. 7 is a transverse diagrammatic sectional view through an aerodynamic control surface construction embodying dual force producing cylinders in accordance with the present invention.

FIG. 8 is a fragmentary transverse sectional view of generally diagrammatic nature and similar to FIGS. 2 through 5 showing another modification of the invention.

FIG. 9 is a diagrammatic perspective view of another form of aerodynamic force or control apparatus for utility in a jet-propelled vehicle, aircraft, or in other widely variant applications.

FIG. 10 is a longitudinal sectional view through a force producing cylinder constituting one structural embodiment of the present invention whereby the cylinder rotation or suction, or both, can be produced.

With initial reference to FIG. 1, there is illustrated a winged aircraft generally of more or less conventional design which can be propelled by jet engines or conventional propellers (not shown).

In order to augment the lift provided by the wings of the illustrated aircraft, flaps 11 are provided which incorporate a rotating cylinder, a suction cylinder, or an equivalent "force producing cylinder," in a manner to be described in greater detail hereinafter. The aircraft also includes ailerons 12 which also each incorporate a rotating or suction cylinder in accordance with the present invention to enable both the augmentation of lift and also improved roll control of the aircraft by enabling the production of a large asymmetry of the spanwise lift distribution of the aircraft.

Additionally, the aircraft includes an elevator 13 and a rudder 14 as part of its tail structure, these control elements also including rotating or suction cylinders to provide extremely responsive control of pitch, yaw and roll of the aircraft, which controls become of critical importance at low speeds, or near hover if the aircraft is arranged for vertical take-off and landing operation, as will be described and explained hereinafter.

Additional control elements such as spoilers 15 for roll control can be utilized in combination with the ailerons 12, if desired, and their desired effects are emphasized in the combination.

The control and lift augmentation structures for utilization in the aircraft illustrated in FIG. 1 and more particularly the flaps 11, ailerons 12 and/or elevator 13 can take the form illustrated in FIG. 2. More particularly, at the trailing edge of a main air foil section 21, there is mounted a flap 23 for pivotal motion about an axis that coincides with the axis of rotation of a rotating cylindrical structure 22. The flap 23 is pivotally supported from the main air foil section 21 in a conventional fashion and can be moved between its fully deflected position of about 90° whereat it deflects downward the relative airflow to its "flaps up" position, indicated by dotted lines at 24, whereat no lift augmentation nor control effect is experienced, and no drag increase is experienced. The cylinder 22 is suitably supported for rotation from the airfoil section 21 and driven by any suitable means in the rotative direction indicated by the arrow. The support of the rotating cylinder 22 is such that the periphery of the cylinder is contained within the upper and lower surfaces of the air foil section of wing 21 and is also spaced slightly rearwardly from the trailing edge of the wing 21 so that a slot 26 exists between the trailing edge of the wing 21 and the periphery of the cylinder. A pivoted door 26 is supported from the flap to aid in supplying air from below the wing into the slot and a slidable door 27 from the upper surface of the wing 21 and are suitably interconnected mechanically with the flap so that as the flap moves from its fully deflected position to the dotted line disposition, indicated at 24, the doors 26 and 27 respectively pivot and slide into closed positions in alignment with the wing surfaces and the flap 23, thus closing the slot 25 and providing a substantially continuous air foil section.

With reference to sliding door 27, and pivoting door 26, the writer wishes to point out the following details: The normal way to open a slot ahead of a flap is to displace the flap rearwardly from the wing, for instance, the well known slotted flap, or Fowler flap. In FIG. 2, I chose to keep the flap's cylinder without translation with respect to the wing for structural simplicity, hence I open the slot ahead of the cylinder-flap by means of plates 27 and 26. The writer feels that the advantage of the system is in the simplicity of the variable geometry of the slot structure, and that the actual detail of constructing such a system is well known within the state of the art. Evidently all that is required is means for providing plate 26 with angular motion, plate 27 with translational motion, and co-ordination between the mechanical position of the flap 23 and the mechanical position of plates 26 and 27. Now, as an example, one structure that combines rotation of one element and simultaneous translations of another related element is had in FIGS. 1 and 2 of U.S. Patent 2,912,190, wherein point 20 translates and simultaneously element 19 rotates under the motion of piston 34 and by signal from valve 36.

For my system in my FIG. 2, the mechanical position of flap 23 when in position 24 could actuate a piston to provide angular rotation and translation for plates 26 and 27, respectively, in a manner analogous to that shown in reference to FIGS. 1 and 2 of U.S. Patent 2,912,190.

When the flap is in its operative disposition, as illustrated in full lines in FIG. 2 and the rotating cylinder 22 is energized to rotate in the direction indicated by the arrow, air from the undersurface of the wing will be drawn upwardly through the slot by the action of the rotating cylinder and supplemented by the deflecting action of the lower door 26 to emerge at the upper wing surface in a jet which serves to re-energize the boundary layer near the trailing edge at the upper surface of the wing and thence be carried by the action of the rotating cylinder around its periphery and thence downwardly along the rear surface of the dependent flap 23. That portion of the air which does not pass from the undersurface of the wing 21 upwardly through the slot 25 is deflected downwardly by the dependent flap wherefore it can be seen that substantially the entire flow field surrounding the wing, or the propeller slipstream, or gaseous efflux from a gas turbine will be directed downwardly at an angle dependent upon the disposition of the flap 23 and the speed of rotation of the cylinder 22.

As a result of the described change in direction of surrounding gaseous fluid, high lifting forces can be experienced, when the flap is in its illustrated position and the cylinder 22 is rotating, so that low landing speeds of an aircraft are attainable. When the flap is up, as illustrated in dotted lines and indicated at 24, and the doors 26, 27 are closed, a substantially smooth continuation of the main air foil section 21 is provided so that no drag in normal horizontal cruising flight is experienced.

As an alternative, a slightly modified embodiment of the invention illustrated in FIG. 3 utilized a generally similar rotating cylinder flap arrangement for purposes of lift augmentation or control of an aircraft, such as illustrated in FIG. 1. In such modified embodiment, a bracket 36 projecting rearwardly from the trailing edge of the wing 31 pivotally supports on an axis indicated at 38 a conjoined flap 33 and rotating cylinder 32, the rotative axis of the cylinder 32 being displaced from the support axis 38 in contra-distinction to the structure described and illustrated in FIG. 2. This pivotal axis 38 can be positioned near the center of gravity of the rotating cylinder flap structure so as to provide mass balance thereof, and can also support the rotating cylinder flap arrangement so that aerodynamic balance during operation is attainable, thus to improve flutter and stick force characteristics. When the flap 33 is disposed in the dependent disposition illustrated in full lines and the rotating cylinder 32 is rotated in the direction of the arrow, a portion of the air from the undersurface of the wing 31, is drawn upwardly through the slot, indicated at 35, much in the manner described in connection with the first embodiment of the invention of FIG. 2 so as to re-energize the air flow in the wings upper boundary layer and thereafter be caused to pass arcuately around the surface of the rotating cylinder and thence downwardly to impart lift or control forces. It will be observed that the rotating cylinder, when in its operative position illustrated in full lines, protrudes above the surface of the extension of the air foil section 31 to thus come into direct energizing contact with the air flow, but that when it and the flap 33 are pivoted to the inoperative position, indicated by dotted lines, the entire flap and rotating cylinder structure is within the upper and lower surfaces of the air foil section so as to create no drag effect. A door 37 is provided to allow the emergency of cylinder, and to provide lift spoilers for control if necessary. The door closes in flaps up position so as to provide a smooth continuity of surface.

An additional point of distinction of the FIG. 3 structure from that previously described in connection with FIG. 2 is that when the rotating cylinder is moved from its flaps-up dotted line disposition to the full deflection position, an effective extension of the wing chord is achieved to thus provide a further improvement of the lift or control force augmentation described with reference to FIG. 2.

Yet another modification of the rotating cylinder flap structure is illustrated in FIG. 4, this arrangement being generally similar to that disclosed in FIG. 3, wherein the flap 43 and the rotating cylinder 42 are supported about an axis 44 providing mass and aerodynamic balance. However, the supporting bracket 45 for this structure is such that no slot or gap is provided to admit air flow from the undersurface to the upper surface of the wing or air foil section 41. However, since the cylinder 42 rotating in the direction of the arrow shown in FIG. 4, protrudes when in its operative disposition, as illustrated, above the upper surface of the air foil section 41, it comes into direct contact with the boundary layer along the upper surface of wing 41 and the additional effect of the jet of air from the undersurface is made unnecessary. FIG. 4A is a sketch showing the effects of the rotating cylinder on the kinetic energy content of the boundary layer of the wings' and flaps' upper surfaces. As in the previous embodiment of FIG. 3, in FIG. 4 a door or spoiler 46 is provided for yaw and roll control at low speeds when in its upper dotted line disposition, and can be moved to a closed disposition in continuity with that of the adjoining air foil surface when the flap 43 and cylinder 42 are placed in their inoperative dispositions which corresponds to that illustrated in dotted lines in FIG. 3.

Doors 37 and 46 are used as spoilers by displacing them to the dotted line positions in FIG. 3 and 4 respectively, whereby the air from the top of the wing is prevented from arriving smoothly to the top of the cylinder and therefore there is a loss of aerodynamic efficiency and lift.

The spoilers can be activated by means of any of the spoiler activator methods known in the state of the art, for instance a modification of FIGS. 32 and 33 of U.S. Patent 2,045,638 wherein connecting shaft 22 should be connected to spoiler-like element 1 slightly to the rear of hinge axis 10.

Since the effectiveness of the spoiler depends on its vertical projection, the small amount of spoiler deflection (which would only be temporary during cylinder emergence) would only cause a small and temporary loss of lift. Hence these doors can be used both as spoilers and as cylinder doors to provide a single structure acting in unique co-operation between the low drag high speed characteristics (i.e., cylinder fairing door), the low speed lift characteristics (large cylinder upward emergence), and control (spoiler action of plates).

The structure previously described and illustrated in FIGS. 2, 3, and 4 are primarily directed toward lift augmentation or control of an aircraft, while that now to be described and shown in FIG. 5 constitutes a modification adapted to direct the propeller or jet thrust of the aircraft an amount sufficient to enable the device to operate as a VTOL. A fixed surface with a relatively short chord 51 supports pivotally, as indicated at 54, a flap 53 and an associated rotating cylinder 52. The overall length of the flap 53 is large compared to the wing chord. Preferably, the length of the flap 53 is such as to deflect the entire thrust of the propeller or jet stream downwardly and the cylinder 52 projects substantially above the upper surface of the wing 51 when the rotating cylinder flap is in its operative disposition, as disclosed, so as to turn substantially all of the relative gaseous flow downwards.

Furthermore, substantially zero or even positive pitching moments of the described deflected slipstream VTOL structure are possible. While it may be true that in previous deflected slipstream VTOL structures, a negative pitching moment has existed, which in turn tends to force the tail portion of the craft upwardly and necessitates a downward force on the tail so as to maintain equilibrium in hover which downward force in turn obviously subtracts from the total lift achievable, and in addition makes control very difficult. Reference to FIGS. 5A and 5B will immediately show how a positive or zero pitching moment can readily be achieved in hover.

Referring first to FIG. 5A we may consider the forces acting on the wing which are thrust force A, flap force D and wing force B. Aerodynamic balanced flap is assumed. The force vector A represents the thrust of the aircraft and through proper design of a structure, such as in FIG. 5, such force can be arranged to pass through the center of gravity CG of the aircraft. If the location of the flap hinge axis 54 of FIG. 5 is positioned at the center of gravity of the aircraft, and if said flap be aerodynamically balanced, the flap force will also act through the center of gravity and introduce no net couple. (Observe that aerodynamically balanced surfaces have no hinge moments and introduce no net couple.)

Thus these two forces will exert no pitching moment whatsoever, and the resultant pitching moment will be represented simply by the force due to the slipstream effect on the unflapped portion of the wing which would normally be represented substantially as shown by the force vector B which is ahead of the aircraft center of gravity. Obviously, such force vector creates a positive pitching moment which tends to force the tail portion of the aircraft downwardly and can be balanced by additional lifting forces on such tail portion.

It then becomes quite simple to design the structure so that zero pitching moments can be achieved, the general arrangement being illustrated in FIG. 5B. Again, the thrust force of the aircraft is illustrated by the vector A passing through the center of gravity of the aircraft and the force on the unflapped portion of the wing is represented by a similar vector B which provides a clockwise moment about the center of gravity. By merely moving or displacing the hinge position of the flap portion of the wing rearwardly relative to the center of gravity, dependent upon the magnitude and direction of the force vector D, the torque about the center of gravity in a counterclockwise direction due to D can be arranged to balance that produced by the force vector B in a clockwise direction thus ultimately achieving a zero pitching moment for a given flap deflection. Thus ultimately a VTOL aircraft including a wing and rotating cylinder flap structure, such as generally indicated in FIG. 5, can operate in a hover condition with a zero pitching moment with neutral stability and satisfactory control.

It may be mentioned incidentally that with appropriate design, all three force vectors, A, B, and D, as illustrated in FIGS. 5A and 5B could be arranged to pass through the center of gravity so that regardless of their individual magnitudes, pitch equilibrium would be maintained.

It should be observed that other aircraft of this type have different pitch characteristics because:

a. They do not use aerodynamically balanced flaps.
 b. They cannot use such a sharp flap deflection as in FIG. 5, but use smoothly bending Fowler type flaps which produce excessive rearward shifts of the center of pressure.
 c. They do not use such a large ratio of flap chord to wing chord as in FIG. 5.

It has been determined experimentally that a structure substantially as shown in FIG. 5 is capable of deflecting the slipstream of the aircraft through an angle of 90° and furthermore, the resultant upwardly directed forces are approximately equal to that of the total propeller thrust. Accordingly, with sufficient production of thrust vertical take-off and landing operations are enabled.

The purpose of the experiment was to measure the lift that could be developed by a wing with a rotating cylinder flap by changing the momentum in the slip-stream of a propeller by a large angle, and compare the magnitude of such lift to the magnitude of the propeller's thrust.

The geometrical configuration used for the rolling cylinder flap test is similar to the one shown diagrammatically on FIG. 5C.

Propeller thrust measurements were made on the propeller alone.

Lift measurements were made for the wing in the presence of the slip-stream of said propeller.

The results of my experiments indicated that slip-stream rotation of the order of 90° was obtained. Lift forces approximately equal to the thrust forces were obtained. Through gradual turning of the rotating cylinder flap into its flaps up position it becomes a mere continuation of the air foil section, and a gradual transition with horizontal flight can be accomplished. Very low drag can be achieved in the flaps-up position.

Referring next to FIG. 5D there is positioned on the wing 51D the rotating cylinder 52D which forms a part of flap 53D which in turn may pivot about a point 54D. When in the position shown by the solid lines the entire assembly is effecting maximum rotation of the slip-stream, as shown in FIG. 5C, which is a condition which will enable vertical take-off and landing. When in normal flight the cylinder 52D and flap 53D of FIG. 5D are retracted to positions 55D and 56D shown by the dotted lines. When in the position shown by the heavy lines of FIG. 5D, the high-lift device could be used for camber changing with insured attached flow, suitable for STOL or VTOL applications. With reference to flap 56D, it can be made to rotate about joint 54D by any number of means which are known in the art. For instance, the flap could be pivoted about a pivotal axis substantially to the rear of the flap's leading edge in which case the flap's leading edge will protrude above the wing when the flap is deflected. That such is the case is seen by inspecting FIG. 4 wherein flap 43 is pivoted away from its leading edge at axis 44 and consequently when the flap is deflected the leading edge of it protrudes above the wing. Now by inspection of FIG. 5D it can be seen that the cylinder is mounted at the leading edge of the flap. Hence, if the flap is pivoted about an axis rearwardly of the cylinder axis, the cylinder will protrude above the wing as shown in the figure to which the text is directed. Finally, it may be stated that the flap pivot axis itself may be movable with respect to the wing, as in the case of a "Fowler" flap. It should be pointed out that a purpose of the invention is accomplished when the structure is built according to the general proportions of the drawings, and that the exact mechanical devices used to accomplish the flap motions can be designated by anyone skilled in the art. Mechanisms for various kinds of flaps are obvious to anyone skilled in the art. The lower surface of 53D can be kept from interfering with lower surface of 51D obviously by providing a spanwise door on the lower trailing edge of 51D. Such door may be constructed and operated like door 1 of FIG. 3 in U.S. Patent No. 2,045,638. For this illustrative purpose, FIG. 3 should be observed inverted. A door like door 38 of FIG. 2 of U.S. Patent No. 2,169,416 could also be used. Cylinder 22 may be rotated as shown in connection with FIG. 2, U.S. Patent No. 2,973,167.

In the rotating cylinder flap structures of FIGS. 2 through 5, the cylinder itself was arranged to protrude into the slipstream at the upper boundary layer of the air foil section directly or a slot was provided so that even through the cylinder itself remained out of direct contact with such stream, a jet of air was propelled thereinto to reenergize the boundary layer of the wing's upper surface and effect the arcuate deflection of the flow thereof. In certain instances, neither the projection of the rotating cylinder nor the production of the jet stream through a slot may be desirable and the structure illustrated in FIG. 6 can be employed. As there illustrated, a wing section 61 supports a flap 62 and an associated rotating cylinder 63 for pivoting and rotation about a coincident axis 64, such axis being such that the cylinder periphery is at all times within the outer surfaces of the air foil section of wing 61. In order to produce aerodynamic effect between such rotating cylinder and the boundary layer at the upper surface of wing 61, when the flap 62 is deflected as illustrated, a door 65 is arranged to move downwardly from its position as part of the upper surface of the air foil section, thus to allow the air stream to be moved downwardly into proximity with the surface of the rotating cylinder, and ultimately achieve the desired deflection of such stream in the manner described in connection with the prior embodiments of the invention.

The instance had in mind by the applicant is the use of a rotating cylinder with an axis coincident with the flap axis and with the periphery of the cylinder within the basic airfoil contour (flaps up), with the added requirement of no slot flow from below the surface of the wing ahead of the cylinder through a slot, but yet ample cylinder surface exposed to the airstream from above the wing when high lift is required. These instances are those required by simplicity for aircraft, high lift and low drag at high speed—i.e., no cylinder translation (simplicity), ample surface of cylinder exposed (lift), and no cylinder projection (low drag). With reference to door 65, it can be seen that door 65 is pivoted to the rear most portion of the upper fixed wing skin 61, and in addition, the door itself folds in a spanwise axis to expose surface of cylinder 63. Now this is a simple problem which has many possible solutions which are available to those skilled in the art. As an example of a mechanism similar in its mechanical aspects, reference is made to U.S. Patent 2,041,688, FIG. 9, which shows several similar spanwise doors, for instance doors 26 and 27, but somewhat more complicated than my door 65 of my FIG. 6. My door 65, however, should be somewhat differently mounted as shown in my figure, or as door 1, FIG. 3 of U.S. Patent 2,045,638.

It is believed apparent from what has been described relative to the general arrangement of the lifting cylinder that if such arrangement were to be utilized for example as a rudder requiring deflection of the slipstream in either direction, aerodynamic considerations would require a change in rotative direction of the cylinder itself for opposite flap deflections. Such necessity for change in rotative direction of the cylinder would obviously limit the speed of change in direction of the control forces and if, for example, a rudder is to be utilized for rapid change in direction, the modified arrangement illustrated in FIG. 7 is preferably employed. As there shown, a fixed member such as fin 71 mounts an associated rudder 74 for pivotal movement about a vertical axis 75. At the leading edge of the rudder, two rotating cylinders 73 and 72 are mounted and these revolve in opposite directions, as indicated by the arrows. When the rudder 74 is displaced on its axis 75 to the disposition illustrated in FIG. 7, rotation of the cylinder 72 effects a flow of air through the gap between it and the trailing edge of the fin 71 and along one surface of the rudder, while rotation of the other cylinder 73 in the opposite rotative direction produces an arcuate movement of the air along the opposite surface of the rudder 74. Thus large deflecting forces are obtained as experienced in the use of the previously described rotating cylinder flaps; but again, if the rudder 74 is pivoted to an opposite disposition, the same but opposite effect will occur without change in rotative direction of the cylinders 72 and 73.

Thus far have been described various arrangements generally employing a rotating cylinder flap or its substantial aerodynamic equivalent the suction cylinder flap. However, the aerodynamic forces which can be produced by rotating, suction or other force-producing cylinders can be applied to aircraft in other fashions.

In FIG. 8 a further modified embodiment is illustrated wherein the rotating cylinder flap arrangement is combined with a blown or jet flap wherein a separately energized jet of air or the hot gas efflux from a jet engine is directed generally in the direction of the rotating cylinder surface. In the combination, as illustrated in FIG. 8, an air foil section 81 supports a rotating cylinder 82 and an associated flap 83 much in the fashion described with respect to FIGS. 2 through 6. Additionally, the air foil section supports the source of air or other hot gases, as indicated diagrammatically at 84, which emerge through a rearwardly directed restricted opening 85 in a substantially tangential relationship with the periphery of the cylinder. The flow of the emergent air or other gases is similar to the flow of air through the slot 25 in FIG. 2 so that the slipstream at the upper boundary layer of the air foil section is reenergized and thereafter deflected about an arcuate path to emerge downwardly along the rear surface of the flap 83.

The advantages of such combination are numerous; the power required for the combined jet flap and the rotating cylinder will be smaller than the sum of the powers necessary when each arrangement is utilized alone; furthermore, for a fixed power input from the jet 84, larger flap deflection can be achieved with the aid of the rotating cylinder so that larger lift or control forces are obtainable. Additionally, if the jet 84 issues hot gases, a continually different surface of the rotating cylinder 82 is exposed thereto to reduce and equalize the heating effect so that no damage to the cylinder and unequal stress distribution to the structure will result.

From the foregoing descriptions, it will be apparent that yet further applications of the rotating cylinder flap can be achieved. In the general arrangement, diagrammatically illustrated in FIG. 9 the member 91 there illustrated can be a jet engine, a source of air flow for a flying platform, an air conditioning system, or can even be a source of liquid rather than gaseous fluids. In any event, the force-producing cylinder 92 with associated flap 93 is placed in the stream of fluid and when deflected from the aligned disposition illustrated by dash lines at 95 to the dependent disposition indicated in full lines at 93, and the cylinder 92 made to rotate in the direction of the arrow, the stream of fluid will be deflected as indicated by the streamlines 96. Tip plates 94 can be positioned at the opposite ends of the cylinder 92 for confinement of the stream.

The force producing cylinders of the specification can take the specific form illustrated in FIG. 10. As there illustrated, the hollow cylinder 111 is mounted for rotation, by journals 112, and 113 on a fixed shaft 114. The shaft 114 is part of a gas turbine, including compressor 116 and turbine 117, which when energized imparts rotative motion to the cylinder 111 to provide the described lift or control forces. During such operation, air through the open end 118 of the cylinder passes into the turbine and is exhausted in any desired direction to augment the control or lifting forces.

To provide a suction device, either rotating or non rotating, the end of the cylinder 111 is closed and the cylinder is made porous so that suction through its cylindrical walls is effected to achieve the desired lift or control forces. According to the invention, the lift-producing cylinders are placed at the leading edge of flaps. For rotation or rotation and suction, shaft 114 could be fixed to the wing or the flaps whereby the cylinder would rotate and if the end 118 be closed, suction and rotation would result. For suction only, member 113 and 118 could be fixed to the flap or wing and the shaft would rotate to provide suction.

The construction of the force producing cylinders is thought to present no problem to those skilled in the art. A non-rotating suction cylinder with suction applied in its interior, and a porous surface portion which has the general shape of the arc of a cylinder can be constructed by the methods known to those skilled in the art for cylindrical shells and porous materials. In fact, porous cylinders are available commercially in stock. More specifically, a porous suction cylinder could be constructed for a circular or thick elliptic cylinder according to U.S. Patent 2,843,341, "Airfoil, Variable Permeability Materials and Methods of Fabrication Thereof."

In the case of blowing cylinders, they may incorporate a blowing duct structure similar to that of U.S. Patent 2,844,337, or U.S. 3,009,668. In the case of rotating cylinders, reference is made to the ample publications on rotating cylinders, which can be found in the publications of a subclass 10 of class 244. The disclosure and claims are directed primarily to aerodynamic structures, the constructions and functions of which are disclosed in sufficient detail for a person skilled in aerodynamics to understand and use. It is well within the skill of persons in the art to supply any necessary support and manipulating elements such as gears, hydraulic cylinders, shafts, links, etc., to manipulate the structures as described.

Various further modifications and alterations from those described can obviously be made without departing from the spirit of this invention, and the foregoing are to be considered purely as exemplary applications thereof. The actual scope of the invention is to be indicated by reference to the appended claims.

What is claimed is:

1. In an airplane wing the improvement comprising a force producing cylinder mounted near the trailing edge of said wing, a flap in the trailing edge of said wing, the axis of said cylinder being positioned so that it is substantially parallel to the largest dimension of said wing, said cylinder being further so positioned that its surfaces are substantially completely within the surfaces of said wing while said airplane is in normal flight, means for elevating said cylinder so that its surface protrudes above the upper surface of said wing, means for energizing said cylinder, and means for lowering said flap whereby a substantial increase in lift on said airplane is produced.

2. In an airplane having wings the improvement comprising force producing cylinders in combination with flaps, said cylinders and flaps being positioned on the trailing edges of said wings, means for energizing said cylinders, means for lowering said flaps while elevating said cylinders into the relative air flow of said airplane whereby said airplane is rendered capable of high-lift such as that needed for vertical and for short takeoff and landing.

3. Aerodynamic apparatus for a winged aircraft which comprises a flap having a leading edge and a trailing edge, a force producing cylinder mounted on said leading edge of said flap, and means mounting said flap and cylinder on the trailing edge of the wing for pivotal movement between a flight position with said cylinder positioned in the said wing and a high lift position with a substantial portion of said cylinder positioned above said wing and with said trailing edge of said flap below said wing.

4. The aerodynamic apparatus of claim 3 is characterized further by the inclusion of a movable door mounted on said wing movable between a closed position covering said cylinder when said flap is in said flight position and an open position permitting pivotal movement of said cylinder into and out of said wing.

5. The apparatus of claim 4 characterized further in what said door is mounted for pivotal movement between said open door position and a door position above said open door position in which said door is substantially inclined to said wing and spoils the flow of air arriving to said flap.

6. A high lift wing for aircraft and the like comprising a wing portion adapted to be mounted on an airframe and having an upper surface, a lower surface and a trailing edge, a flap structure mounted on said wing portion adjacent to said wing trailing edge and having a flap leading edge adjacent to said wing portion and a flap trailing edge remote from said wing portion and flap upper and lower surfaces defining therebetween the depth of the flap, a force producing cylinder mounted on, and forming the leading edge part of said flap, and with means provided to energize said cylinder, and flap actuating means for moving said flap structure between a flight position generally parallel to and trailing said wing portion and a high lift position inclined at an angle to said wing portion comprising means for elevating said flap leading edge above said wing upper surface and depressing said flap trailing edge below said wing lower surface by an amount sufficient to cause the uppermost portion of the cylinder to protrude above the upper surface of the wing by a distance of the order of, or greater than, two-sixths of the maximum thickness of said trailing edge flap when said flap is deflected to its maximum lift position.

7. The system of claim 6 with said means of elevating said flap leading edge comprising a pivotal hinge between said flap and said wing portion generally parallel to said wing trailing edge and positioned in a chordwise location to the rear of the forwardmost portion of the leading edge of said flap at a distance approximately as great as the maximum thickness of said trailing edge flap.

8. The structure of claim 7 in which said pivotal hinge is adjacent to the upper surface of said flap.

9. Aerodynamic apparatus for winged aircraft which comprises a flap with an associated force-producing cylinder, means mounting said flap and cylinder on the trailing edge of the wing for pivotal movement about an axis such that substantially aerodynamic and mass balance of said conjoined flap and cylinder are attained.

10. The structure of claim 9 further characterized in that said flap and cylinder are mounted on said wing in a position relative to the center of gravity of the aircraft such that the combined aerodynamic forces on the wing flap and cylinder produce a negligible pitching moment about the center of gravity of the aircraft.

11. A high lift wing for aircraft and the like comprising a primary wing portion adapted to be mounted on an air frame and having a leading edge and a trailing edge, a propeller mounted on said primary wing portion in advance of said leading edge thereof and having an axis of rotation generally parallel to a chordwise direction of said wing, power means for rotating said propeller about its axis for directing a stream of air toward said leading edge of said primary wing portion, a flap mounted on said primary wing portion adjacent to said trailing edge of said primary wing portion and having a flap trailing edge remote from said primary wing portion and a flap leading edge adjacent to said trailing edge of said primary wing portion with said flap having a force producing cylinder mounted on said flap leading edge and a flap actuating means for moving said flap between a flight position generally parallel to and trailing said primary wing portion and a high lift position inclined at a substantial angle to said primary wing portion, and in which said leading edge of said flap protrudes substantially above the upper surface of said primary wing portion, and means to energize said force-producing cylinder, the distance between the leading edge and trailing edge of said primary wing portion being less than a distance approximately equal to the radius of said propeller, and the distance between the leading edge and trailing edge of said flap being of the order of said radius of said propeller.

12. The structure of claim 11 further characterized in that the combined capacity of said power means is sufficiently great to generate propeller thrusts of the order of the weight of said aircraft.

13. In an airplane wing the improvement comprising a cylinder rotatably mounted near the trailing edge of said wing, a flap at the trailing edge of said wing, the axis of said cylinder being positioned so that it is substantially parallel to the largest dimension of said wing, said cylinder being further so positioned that its surfaces are substantially completely within the surfaces of said wing while said airplane is in normal flight, means for elevating said cylinder so that its surface protrudes above the upper surface of said wing, means for rotating said cylinder about its axis, and means for lowering said flap whereby a substantial increase in lift on said airplane is produced.

14. In an airplane having wings the improvement comprising rotating cylinders in combination with flaps, said cylinders and flaps being positioned on the trailing edges of said wings, means for rotating said cylinders, means for lowering said flaps while elevating said cylinders into the relative air flow of said airplane whereby said airplane is rendered capable of high-lift such as that needed for vertical and for short take-off and landing.

15. A high lift wing for aircraft and the like comprising a primary wing portion adapted to be mounted on an air frame and having a top surface, a leading edge, and trailing edge, a propeller mounted on said primary wing portion having an axis of rotation generally parallel to a chordwise direction in said wing, power means for rotating said propeller about its axis for directing a stream of air toward said leading edge of said primary wing portion, a flap mounted on said primary wing portion adjacent to said trailing edge of said primary wing portion and having a flap trailing edge remote from said fixed wing portion, flap actuating means for moving said flap between a flight position generally parallel to and trailing said primary wing portion and a high lift position inclined at a substantial angle to said primary wing portion, a cylinder between said fixed wing portion and said flap with its axis of symmetry generally parallel to said trailing edge of said wing portion, and means for rotating said cylinder, the distance between the leading edge and trailing edge of said primary wing portion being less than a distance approximately equal to the radius of said propeller, and the distance between the leading edge and trailing edge of said flap being of the order of the radius of said propeller.

16. A high lift wing for aircraft and the like comprising a primary wing portion adapted to be mounted on an air frame and having a leading edge and a trailing edge, a propeller mounted on said primary wing portion in advance of said eading edge thereof and having an axis of rotation in a pane generally parallel to a chordwise direction in said wing, power means for rotating said propeller about its axis for directing a stream of air toward said leading edge of said primary wing portion, a flap mounted on said primary wing portion adjacent to said trailing edge of said primary wing portion and having a flap trailing edge remote from said primary wing portion, flap actuating means for moving said flap between a flight position generally parallel to and trailing said primary wing portion and a high lift position inclined at a substantial angle to said primary wing portion, a cylinder mounted on said flap adjacent to said trailing edge of said primary wing portion with the surface of said cylinder defining a leading edge of said flap, and means for rotating said cylinder, the distance between the leading edge and trailing edge of said fixed wing portion being less than a distance approximately equal to the radius of said propeller, and the distance between the leading edge and trailing edge of said flap being of the order of said radius of said propeller.

17. The high lift wing of claim 16 in which said leading edge of said cylinder protrudes above the top surface of said primary wing portion by a distance at least as great as fifteen percent of the radius of said cylinder when said flap is in said high lift position.

18. In an aircraft having a central body portion, a pair of wings mounted on said central body portion and extending laterally from opposite sides thereof, and power means for moving said aircraft through the air and thereby generating a flow of air over said wings, the improved wing for imparting high lift to said aircraft and reducing the tendency of said aircraft to pitch forwardly on its nose during landing and take-off which comprises, a primary wing portion mounted on said central body portion and having a leading edge and a trailing edge and upper and lower wing surfaces, a flap portion mounted on said primary wing portion adjacent to said trailing edge with a cylinder connected to said flap portion adjacent to said trailing edge, said cylinder being generally parallel to said trailing edge and having a diameter at least half as great as the maximum distance between said upper and lower surfaces, means for rotating said cylinder, and flap actuating means for moving said flap between a flight position generally parallel to and trailing said fixed wing portion with said cylinder housed substantially completely within said primary wing portion and a high lift, flap deflected position with said flap inclined at a substantial angle to said primary wing portion, and with said cylinder protruding above said upper surface of said primary wing portion by a distance at least as great as fifteen percent of the radius of said cylinder.

19. A high lift wing for aircraft and the like comprising a wing portion adapted to be mounted on an airframe and having an upper surface, a lower surface and a trailing edge, a flap structure mounted on said wing portion adjacent to said wing trailing edge and having a flap leading edge adjacent to said wing portion and a flap trailing edge remote from said wing portion and flap upper and lower surfaces defining therebetween the depth of the flap, a rotating cylinder mounted on, and forming the leading edge part of said flap, and with means provided to rotate said cylinder with its upper surface moving in the direction of the airflow, and flap actuating means for moving said flap structure between a flight position generally parallel to and trailing said wing portion and a high lift position inclined at an angle to said wing portion comprising means for elevating said flap leading edge above said wing upper surface and depressing said flap trailing edge below said wing lower surface by an amount sufficient to cause the upper most portion of the cylinder to protrude above the upper surface of the wing by a distance of the order of, or greater than, two-sixths of the maximum thickness of said trailing edge flap when said flap is deflected to its maximum lift position.

20. The system of claim 19 with said means of elevating said flap leading edge comprising a pivotal hinge between said flap and said wing portion generally parallel to said wing trailing edge and positioned in a chordwise location to the rear of the cylinder axis when said flap is in said flight position.

21. In an aircraft having a fuselage, a pair of wings mounted on said fuselage and extending laterally from opposite sides thereof, and power means for moving said aircraft through the air and thereby generating a flow of air over said wings, the improved wing for imparting high lift to said aircraft which comprises: a primary wing portion mounted on said fuselage and having a leading edge and a trailing edge and upper and lower wing surfaces, a flap portion mounted on said primary wing portion adjacent to said trailing edge with a cylinder connected to said flap portion adjacent to said trailing edge, said cylinder being generally parallel to said trailing edge and having a diameter at least half as great as the maximum distance between said upper and lower surfaces, means for rotating said cylinder, and flap actuating means for moving said flap between a flight position generally parallel to and trailing said primary wing portion and a high lift, flap deflected position with said flap inclined at a substantial angle to said primary wing portion and with said cylinder protruding above said upper surface of said primary wing portion by a distance at least as great as fifteen percent of the radius of said cylinder.

22. A deflected slipstream aircraft capable of substantially vertical flight and having a reduced tendency to pitch toward the nose of said aircraft during such vertical flight comprising a fuselage and a pair of wings mounted on opposite sides of said fuselage, each of said wings comprising a primary wing portion, mounted on said fuselage extending laterally therefrom and having a top surface, a leading edge and a trailing edge, a propeller mounted in front of said primary wing portion having an axis of rotation generally parallel to a chordwise direction in said wing, power means for rotating said propeller about its axis for directing a stream of air toward said leading edge of said primary wing portion, a flap mounted on said primary wing portion adjacent to said trailing edge of said primary wing portion and having a flap leading edge adjacent to said primary wing portion and a flap trailing edge remote from said primary wing portion, flap actuating means for moving said flap between a flight position generally parallel to and trailing said primary wing portion and a high lift position inclined at a substantial angle to said primary wing portion, a cylinder between said primary wing portion and said flap with its axis of symmetry generally parallel to said trailing edge of said primary wing portion, and means for rotating said cylinder, the distance between the leading edge and trailing edge of said primary wing portion being less than a distance approximately equal to the radius of said propeller, and the distance between the leading edge and trailing edge of said flap being of the order of the radius of said propeller, the combined capacity of said power means adjacent to said wings being sufficiently great to generate propeller thrust on the order of the weight of said aircraft.

23. A deflected slipstream aircraft capable of substantially vertical flight and having a reduced tendency to pitch toward the nose of said aircraft during such vertical flight comprising a fuselage and a pair of wings mounted on opposite sides of said fuselage, each of said wings comprising a primary wing portion mounted on said fuselage and having a leading edge and a trailing edge, a propeller mounted on said primary wing portion in advance of said leading edge thereof and having a generally horizontal axis of rotation, power means for rotating said propeller about its axis for directing a stream of air toward said leading edge of said primary wing portion, a flap mounted on said primary wing portion adjacent to said trailing edge of said primary wing portion and having a flap trailing edge remote from said primary wing portion, flap actuating means for moving said flap between a flight position generally parallel to and trailing said primary wing portion and a high lift position inclined at a substantial angle to said primary wing portion, a cylinder mounted on said flap adjacent to said trailing edge of said primary wing portion with the surface of said cylinder defining a leading edge of said flap, and means for rotating said cylinder, the distance between the leading edge and trailing edge of said primary wing portion being less than a distance approximately equal to the radius of said propeller, and the distance between the leading edge and trailing edge of said flap being of the order of said radius of said propeller, and the combined capacity of said power means for rotating said propeller being sufficiently great to generate propeller thrust on the order of the weight of said aircraft.

24. The deflected slipstream aircraft of claim 23 in which said cylinder protrudes substantially above the top surface of said primary wing portion when said flap is in said high lift position.

25. The apparatus of claim 13 characterized further in that a movable door is mounted between the trailing edge of said wing and said flap covering said cylinder, and means are provided to move said door to a position uncovering said cylinder to permit said cylinder to be elevated.

26. The structure of claim 15 characterized further in that a movable door is mounted between said wing and said flap covering said cylinder when said flap is in said flight position and means provided to move said door and uncover said cylinder when said flap is in said high lift position.

27. The structure of claim 3 further characterized in that said force producing cylinder is energized by a gas turbine engine mounted inside of and concentric to said force producing cylinder on said leading edge of said flap.

References Cited in the file of this patent

UNITED STATES PATENTS

| | | |
|---|---|---|
| 1,927,538 | Zaparka | Sept. 19, 1933 |
| 2,569,983 | Favre | Oct. 2, 1951 |
| 2,730,313 | Ringham | Jan. 10, 1956 |

FOREIGN PATENTS

| | | |
|---|---|---|
| 616,551 | France | Oct. 29, 1926 |
| 637,289 | France | Jan. 28, 1928 |
| 266,824 | Italy | Aug. 13, 1929 |